April 16, 1963 J. BLAIR 3,086,042
CONTINUOUS PRODUCTION OF LIQUID EXPLOSIVE NITRIC ESTERS
Filed Oct. 30, 1956
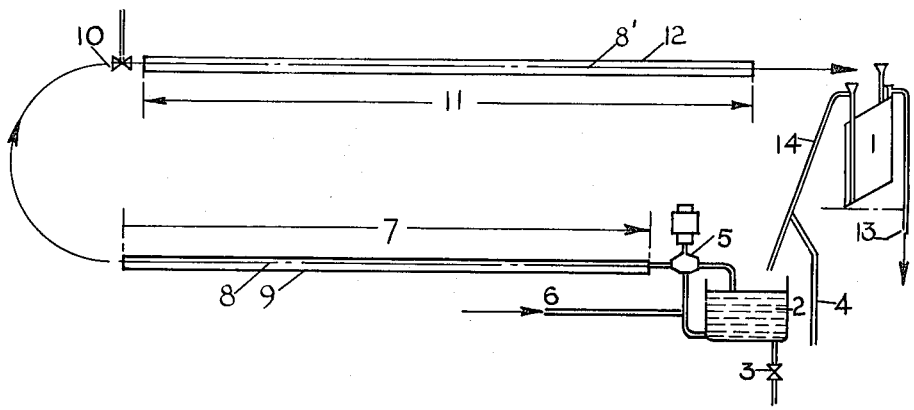
INVENTOR
James Blair
By Cushman, Darby & Cushman
ATTORNEYS

United States Patent Office 3,086,042
Patented Apr. 16, 1963

3,086,042
CONTINUOUS PRODUCTION OF LIQUID
EXPLOSIVE NITRIC ESTERS
James Blair, Seamill, Scotland, assignor to Imperial Chemical Industries Limited, London, England, a corporation of Great Britain
Filed Oct. 30, 1956, Ser. No. 619,167
Claims priority, application Great Britain Dec. 23, 1955
3 Claims. (Cl. 260—467)

The present invention is concerned with a new or improved process for the continuous production of liquid explosive nitric esters of polyhydric alcohols for example nitroglycerine or its mixtures with ethylene glycol dinitrate or nitropolyglycerines.

In for instance British specification No. 604,874 there is described a process for the continuous production of explosive liquid nitric esters from rapidly esterifiable liquid polyhydric alcohols which comprises continuously introducing the alcohol and nitrating acid into a mixing space, subjecting the incipiently reacted mixture to continuous circulation by impelling it at a rate sufficient to maintain turbulence throughout the circulation out of the lower part of said space through a narrow externally cooled tubular conduit external to said space to a horizontally remote locus at which the reaction is complete and back into the upper part of said space, bleeding off a portion of the substantially completed mixture at said remote locus, and separating by continuous centrifugal action the liquid explosive nitric ester from the bled-off portion while the latter is still in emulsion form. It is stated in said specification that apparatus for carrying out the process described therein can comprise in combination a mixing vessel having a lower portion of larger diameter accommodating a rotary impellor, an upper neck portion of smaller diameter at the top connecting the shaft of the said impellor and inlets for the liquid reagents, an external circulating pipe jacketed over substantially its whole length and leading from the said vessel at the level of said impellor to a horizontally remote locus and returning into the neck of said vessel, a continuous centrifugal separator in the vicinity of said locus at a lower hydrostatic level than said vessel, and a branch communication from a portion of said external circular pipe at said locus entering said centrifugal separator.

The object of the present invention is to provide a process which permits the employment of a portion of refuse acid for admixture with nitrating mixed acid in a process for the continuous production of explosive nitric esters from rapidly esterifiable liquid polyhydric alcohols wherein the nitration of a polyhydric alcohol of the aforesaid kind takes place in an extended tubular structure and wherein the nitrated polyhydric alcohol and refuse acid leave this structure at a locus where the reaction is complete and which is horizontally remote from the neighbourhood where nitrating mixed acid is diluted with refuse acid and the thus diluted nitrating mixed acid enters the tubular structure.

According to the present invention the process for the continuous production of explosive liquid nitric esters from rapidly esterifiable liquid polyhydric alcohols and mixed nitrating acids comprises employing a continuous cycle of inter-related operations comprising introducing nitrating mixed acid into a stream of refuse acid substantially free from suspended nitrated polyhydric alcohol, cooling the resulting mixture of thus diluted nitrating mixed acid to a temperature sufficiently low to permit the subsequent mixture of the polyhydric alcohol and diluted nitrating mixed acid to require at the most only slight cooling for the temperature to be between those limits which permit nitration to take place and which exclude the possibility of any decomposition of the resulting nitrated polyhydric alcohol during the passage under pressure of the diluted nitrating mixed acid through an extended tubular structure of a diameter at least sufficiently narrow to ensure turbulence in said acid at the rate of flow thereof subsequent to the introduction under pressure of the polyhydric alcohol into the stream of said acid in said extended tubular structure, arranging that said first mentioned pressure is sufficiently high to overcome the back pressure of said extended tubular structure up to a horizontally remote locus where the reaction is complete and causing the resulting emulsion of nitrated polyhydric alcohol and refuse acid to leave the extended tubular structure at said remote locus, passing said mixture into a separating device to separate the refuse acid from the nitrated polyhydric alcohol and employing the required portion of thus separated refuse acid for said stream of refuse acid for introducing therein said nitrating mixed acid.

The mixed nitrating acid may be a mixture of sulphuric acid, preferably oleum, and nitric acid; or a mixture of phosphoric acid and nitric acid.

It is preferred for the diluted mixed nitrating acid to pass through two long pipes of suitable and different internal diameter joined together by a venturi throat. The internal diameter of these pipes on either side of the venturi throat may be for instance 0.75 inch and 0.5 inch and the polyhydric alcohol is introduced into the venturi throat so that it is reacted upon by the diluted mixed nitrating acid in the pipe of lesser diameter. Furthermore these long pipes are preferably surrounded by jackets through which a cooling medium, preferably brine, can be passed.

It is preferred for the polyhydric alcohol to be introduced under pressure by a metering pump and through a venturi throat into the stream of the acid in the extended tubular structure so that there is a high degree of turbulence and so of dispersion of said polyhydric alcohol in the neighbourhood where it is introduced into said stream. This is desirable as the rate of nitration of the alcohol depends upon its degree of dispersion in the nitrating mixed acid.

As the heat evolved on mixing nitrating mixed acid with refuse acid is removed at least in part before the liquid polyhydric alcohol is introduced into the diluted nitrating mixed acid an advantage of the invention is that less heat will be generated in that portion of the extended tubular structure where nitration takes place.

The nitrating mixed acid is delivered under pressure from its reservoir into a mixing region and the refuse acid is preferably withdrawn from its reservoir so as to enter the same mixing region and the resulting mixture is introduced as diluted nitrating mixed acid into the long pipes of the extended tubular structure by a centrifugal pump which has the necessary power to provide the pressure required for the diluted nitrating mixed acid to be in a turbulent condition after the injection of the polyhydric alcohol and so in the form of an emulsion throughout that portion of the extended tubular structure in which there is nitrated polyhydric alcohol.

The separating device for separating the refuse acid from the nitrated polyhydric alcohol can be either a static separator or preferably a centrifugal separator. Preferably the separating device is embedded in a concrete shielding structure.

It may also be desirable for the extended tubular structure to be positioned in a concrete lined trench and for the extended tubular structure to pass through one or more concrete explosion baffles running transversely across the trench. For instance the region where the liquid polyhydric alcohol is injected into the diluted nitrating mixed acid may be considered as dangerous and should therefore not only be sufficiently far away from the separator that if an explosion does occur it does not endanger the separator but also it may be considered highly desirable for this region to be also protected in a concrete explosion baffle.

The invention is illustrated with reference to the following example and the diagrammatic drawing accompanying the specification.

*Example*

A portion of refuse acid discharged from the separator 1 is collected in well 2, provided with a drain and cock 3, the remainder being purged to waste at 4. Centrifugal re-cycle pump 5 capable of pumping at a rate of 5 gal./min. against a head of 85 ft. of liquid of specific gravity 1.75 continuously withdraws refuse acid from the well 2 and mixed nitrating acid from a reservoir is delivered under pressure to the suction side of the pump at 6 which then delivers the thus diluted nitrating mixed acid to a pre-cooling zone 7 comprising a horizontally stainless steel pipe 8 having an internal diameter of 0.75 inch surrounded by a jacket 9 through which brine is circulated. The pressure generated by said centrifugal re-cycle pump 5 is sufficient to cause the diluted nitrating mixed acid to flow throughout the length of pipe 8 and later in a turbulent manner, i.e. as an emulsion with the resulting nitrated liquid polyhydric alcohol which is derived from a liquid polyhydric alcohol, for example glycerine, which is admitted under pressure by a metering pump at the desired rate into a venturi throat 10 interposed between said pre-cooling zone 7 and a nitrating zone 11 comprising pipe 8' of internal diameter 0.5 inch and a brine circulation cooling jacket 12. This resulting emulsion of polyhydric alcohol and refuse acid is discharged at the exit of pipe 8', where the reaction is complete, into separator 1 which discharges the liquid explosive nitric ester through pipe 13 to a washing system (not shown) and the refuse acid through pipe 14 so that a portion of it enters the well 2 and the rest of it is purged to waste through pipe 4 as aforementioned.

Typical data for the production of 120 lb./hr. of a nitrated 80/20 mixture of glycerine and ethylene glycol are as follows:

| | |
|---|---|
| Refuse acid discharged from separator into well 2 | 5,300 lb./hr. |
| Pump duty | 5 gal./min. against a head of 85 ft. of liquid of specific gravity 1.75. |
| Nitrating acid admitted at 6 | 264.5 lb./hr. |
| 80/20 glycerine glycol mixture admitted at 10 | 50.9 lb./hr. |
| Refuse acid purged at 4 | 187.4 lb./hr. |
| Bore of pipe 8' in nitrating zone 11 | 0.5 inch. |
| Length of pipe 8' in nitrating zone 11 | 50 feet. |
| Bore of pipe 8 in precooling zone 7 | 0.75 inch. |
| Temperature of refuse acid leaving separator | 15° C. |
| Temperature of diluted nitrating acid at point of admission of glycerine/glycol mixture at venturi throat 10 | 10°–11° C. |
| Temperature of 80/20 glycerine/glycol mixture admitted at venturi throat 10 | 29° C. |
| Temperature of emulsion after addition of 80/20 mixture glycerine/glycol on entering nitrating zone 11 | 15°–16° C. |
| Temperature of emulsion on entering separator 1 | 15° C. |
| Specific heat of 80/20 glycerine/glycol mixture | 0.555 CHU (lb./° C.). |
| Specific heat of diluted nitrating mixed acid | 0.398 CHU (lb./° C.). |
| Heat of nitration reaction | 44.03 CHU/lb. nitroglycerine/glycol mixture. |
| Heat removed from nitrating mixed acid in precooling zone 7 | 11,000–14,000 CHU/hr. (approx.). |
| Heat removed from emulsion in nitrating zone 11 | 3,000–0 CHU/hr. (approx.). |

It will be seen from the aforesaid figures that the percentage of nitroglycerine (free and in solution) in the emulsion with the refuse acid resulting from the diluted nitrating mixed acid is only about 2.3% and so the consequences of a decomposition are minimised.

What we claim is:

1. A process for the continuous production of explosive liquid nitric esters from rapidly esterifiable liquid polyhydric alcohols selected from the group consisting of glycerine and mixtures of glycerine with other polyhydric alcohols, and a nitrating mixed acid, comprising introducing a fresh nitrating mixed acid into a stream of refuse acid substantially free from suspended nitrated polyhydric alcohol, precooling the resulting diluted nitrating mixed acid and coincidentally passing the same under pressure through a first extended tubular structure which leads into a second and narrower extended tubular structure having a bore at least sufficiently narrow to insure the maintenance of turbulence of liquid flowing throughout its length, introducing said liquid polyhydric alcohol into the stream of said diluted acid downstream of said first extended tubular structure under positive pressure sufficiently high to overcome the resulting back pressure, cooling the resulting mixture of diluted acid and polyhydric alcohol and coincidentally passing the same through said second extended tubular structure over a sufficient length thereof to insure that nitration is carried out and completed only within the same, passing the resulting emulsion of nitrated polyhydric alcohol and refuse acid from said second extended tubular structure into a separating device remote from the locus where said polyhydric alcohol enters the stream to thereby separate the refuse acid from the nitrated polyhydric alcohol, and introducing the fresh nitrating mixed acid into a stream of the required portion of the separated refuse acid.

2. A process as claimed in claim 1 wherein the nitrating mixed acid is a mixture of oleum and nitric acid.

3. A process for the continuous production of explosive liquid nitric esters of liquid polyhydric alcohols selected from the group consisting of glycerine and mixtures of glycerine with other polyhydric alcohols, and a nitrating mixed acid, comprising introducing a fresh nitrating mixed acid into a stream of refuse acid substantially free from suspended nitrated polyhydric alcohol, precooling the resulting diluted nitrating mixed acid and coincidentally passing the same under pressure through a first tubular structure which leads into a second extended tubular structure to insure the maintenance of turbulence of liquid flowing throughout its length, introducing said liquid polyhydric alcohol into the stream of said diluted acid downstream of said first tubular structure under positive pressure, cooling the resulting mixture of diluted acid and polyhydric alcohol and coincidentally passing the same through said second extended tubular structure over a sufficient length thereof to insure that nitration is carried out and completed only within the same, passing the resulting emulsion of nitrated polyhydric alcohol and refuse acid from said second extended tubular structure into a separating device remote from the locus where said polyhydric alcohol enters the stream to thereby separate the refuse acid from the nitrated polyhydric alcohol, and introducing the fresh nitrating mixed acid into a stream of the required portion of the separated refuse acid, and purifying the separated acid impure nitrated polyhydric alcohol by washing.

References Cited in the file of this patent

UNITED STATES PATENTS

| 449,687 | Maxim | Apr. 7, 1891 |
| 2,737,522 | Nilsson | Mar. 6, 1956 |